United States Patent
Li et al.

(10) Patent No.: US 7,590,172 B2
(45) Date of Patent: *Sep. 15, 2009

(54) LOW BIAS ESTIMATION OF SMALL SIGNAL-TO-NOISE RATIO

(75) Inventors: Bin Li, Shenzhen (CN); Robert A. DiFazio, Greenlawn, NY (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/060,541

(22) Filed: Apr. 1, 2008

(65) Prior Publication Data

US 2008/0181290 A1 Jul. 31, 2008

Related U.S. Application Data

(63) Continuation of application No. 10/867,508, filed on Jun. 14, 2004, now Pat. No. 7,376,178, which is a continuation of application No. 10/269,606, filed on Oct. 11, 2002, now Pat. No. 6,760,370.

(60) Provisional application No. 60/369,655, filed on Apr. 3, 2002.

(51) Int. Cl.
*H04B 3/46* (2006.01)
*H04B 17/00* (2006.01)
*H04Q 1/20* (2006.01)

(52) U.S. Cl. .............. 375/227; 375/229; 375/346; 375/347; 375/348; 375/349; 375/350; 702/69

(58) Field of Classification Search ............... 375/227, 375/229, 346–350; 702/69
See application file for complete search history.

(56) References Cited

U.S. PATENT DOCUMENTS

| 4,627,103 | A | 12/1986 | Fukuhara | |
|---|---|---|---|---|
| 5,870,393 | A | 2/1999 | Yano et al. | |
| 6,269,131 | B1 | 7/2001 | Gothe et al. | |
| 6,442,495 | B1 | 8/2002 | Fleming-Dahl | |
| 6,516,027 | B1 * | 2/2003 | Kapoor et al. | 375/227 |
| 6,571,104 | B1 * | 5/2003 | Nanda et al. | 455/522 |
| 6,611,794 | B1 | 8/2003 | Fleming-Dahl | |
| 6,760,370 | B2 * | 7/2004 | Li et al. | 375/227 |
| 7,376,178 | B2 * | 5/2008 | Li et al. | 375/227 |
| 2001/0029172 | A1 | 10/2001 | Lee et al. | |
| 2002/0051431 | A1 | 5/2002 | Choi et al. | |
| 2002/0080745 | A1 | 6/2002 | Dick et al. | |

FOREIGN PATENT DOCUMENTS

CA 2399078 8/2001

(Continued)

OTHER PUBLICATIONS

Beaulieu et al., "Comparison of Four SNR Estimators for QPSK Modulations," IEEE Communications Letters, vol. 4, No. 2, Feb. 2000, pp. 43-45.

(Continued)

*Primary Examiner*—Curtis B Odom
(74) *Attorney, Agent, or Firm*—Volpe and Koenig, P.C.

(57) ABSTRACT

A user equipment includes an estimator. The estimator is configured to select a first estimate of a signal-to-noise (SNR) ratio, calculate a first amplitude and first noise variance, calculate a second amplitude and a second noise variance, calculate a second SNR, calculate a resolution value, adjust the first SNR, and perform estimation iterations until the resolution value is equal to a predetermined value.

4 Claims, 9 Drawing Sheets

FOREIGN PATENT DOCUMENTS

| KR | 2002-0014147 | 2/2002 |
|---|---|---|
| WO | 01/97411 | 12/2001 |

OTHER PUBLICATIONS

Matzner et al., "An SNR Estimation Algorithm Using Fourth-Order Moments," IEEE Int. Symp. Inform. Theory, Trondheim, Norway, Jun. 1996, p. 119.

Pauluzzi et al., A Comparison of SNR Estimation Techniques for the AWGN Channel, IEEE Transactions on Communications, vol. 48, No. 10, Oct. 2000, pp. 1681-1691.

Proakis, "Digital Communications," NY, McGraw Hill, 1983, pp. 162-165.

Wiesel et al., "Non-Data-Aided Signal-to-Noise-Ratio Estimation," IEEE, 2002.

* cited by examiner

LOW BIAS ESTIMATION OF SMALL SIGNAL-TO-NOISE RATIO

CROSS REFERENCE TO RELATED APPLICATIONS

This application is a continuation of U.S. patent application Ser. No. 10/867,508, filed Jun. 14, 2004 which is a continuation of U.S. patent application Ser. No. 10/269,606, filed Oct. 11, 2002 and issued on Jul. 6, 2004 as U.S. Pat. No. 6,760,370, which claims the benefit of U.S. Provisional Patent Application Ser. No. 60/369,655 filed Apr. 3, 2002, which are incorporated by reference as if fully set forth.

FIELD OF THE INVENTION

The invention relates to processing of communications signals. More particularly, the invention relates to the estimation of the communication signal power in terms of signal-to-noise ratio.

BACKGROUND OF THE INVENTION

In the field of communications, various types of systems use algorithms that depend on a signal-to-noise ratio (SNR) estimate for proper operation. Code division multiple access (CDMA) systems, such as time division duplex CDMA (TDD/CDMA) and time division synchronous CDMA (TD-SCDMA) and frequency division duplex CDMA (FDD/CDMA) and CDMA 2000, use SNR estimation for power control to maintain the required link quality while using the minimum transmitted power. An asymmetric digital subscriber loop (ADSL) system uses SNR for the bit allocation algorithm to select the maximum transmission data rate. In turbo decoders, both the determined signal power and noise power are required. Rate adaptive transmission systems often use SNR to dynamically adapt the modulation scheme or the coding rate.

Several algorithms are known for performing SNR estimation. One such algorithm, the received data-aided (RXDA) estimation, is based on the following equation:

$$SNR = \frac{\left(\frac{1}{N}\sum_{k=1}^{N}|r_k|\right)^2}{\frac{1}{N}\sum_{k=1}^{N}r_k^2 - \left(\frac{1}{N}\sum_{k=1}^{N}|r_k|\right)^2} \qquad \text{Equation 1}$$

where r is the received signal vector and N is the number of sample points read by the receiver for the vector r.

Another known algorithm is the transmitted data-aided (TXDA) algorithm, which is represented by the equation:

$$SNR = \frac{\left(\frac{1}{N}\sum_{k=1}^{N}r_k a_k\right)^2}{\frac{1}{N-3}\sum_{k=1}^{N}r_k^2 - \frac{1}{N(N-3)}\left(\sum_{k=1}^{N}r_k a_k\right)^2} \qquad \text{Equation 2}$$

A third known algorithm for SNR estimation is represented as:

$$SNR = \frac{N}{2}\left(\sum_{k=1}^{N/2}\frac{(|r_{2k-1}| - |r_{2k}|)^2}{r_{2k-1}^2 + r_{2k}^2}\right)^{-1} \qquad \text{Equation 3}$$

The algorithms for Equations 1 and 3 are performed blind without any pilot signal. In contrast, the TDXA algorithm uses a pilot signal with known training sequences, which provides enhanced performance. The drawback of TDXA is that additional equipment is required to process the training sequence. Although the RXDA and Equation 3 algorithms work well when the SNR is high, their performance suffers at low and negative SNRs, where they are known to have a high bias. This is problematic for various communication systems. For example, turbo code applications are known to experience negative ratios of symbol energy to noise density. In CDMA systems, the chip energy to noise density is often negative. Hence, there is a need to develop a blind SNR estimation method that works well at low and negative values without the benefit of a training sequence.

SUMMARY

An apparatus and method for low bias estimation of small or negative signal-to-noise ratio (SNR) for a communication signal is presented. The estimation is iterative and comprises choosing an initial minimum and maximum estimate of the signal amplitude and determining the mean thereof. Associated minimum and maximum noise variances are calculated based on the amplitude values. Using probability density, maximum likelihood estimates of the minimum, maximum and mean amplitudes are derived. Based on whether the mean amplitude estimate increases or decreases, the initial minimum or maximum estimate is set equal to the maximum likelihood mean amplitude, and the resolution between the new minimum and maximum estimates is determined. These steps are repeated until the resolution is within the acceptable limit, at which point the SNR is calculated from the mean amplitude.

DESCRIPTION OF THE PREFERRED EMBODIMENTS

Figure 1:
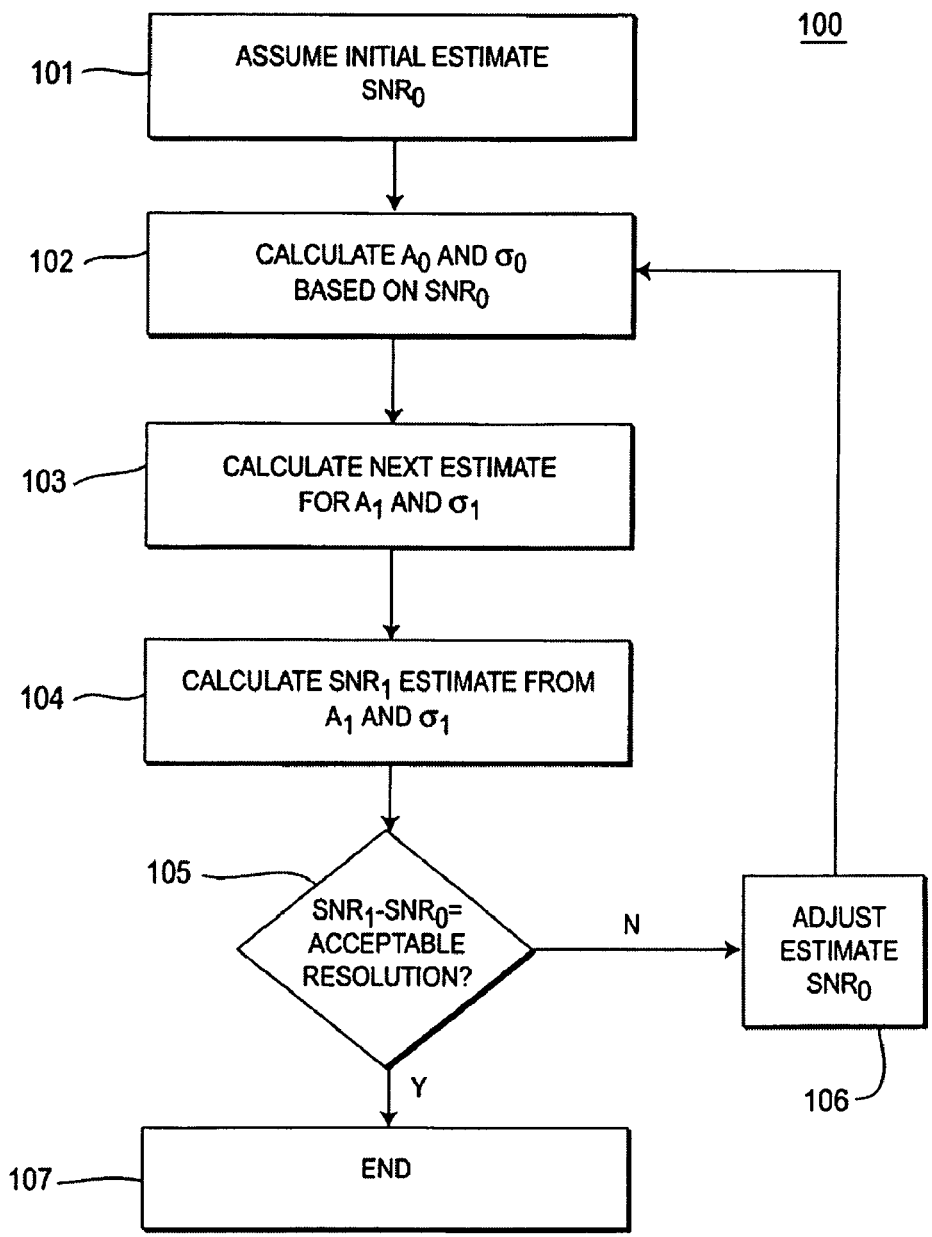
FIG. 1 shows a process flow diagram of method 100 for SNR estimation.

For a BPSK modulated signal, the time and carrier phase synchronization can be obtained so the received samples can be expressed as:

$$r_k = s_k + n_k, \quad \text{Equation 4}$$

where $s_k$ is the transmitted signal taking amplitude values from $\{-A, A\}$ with equal probability and $n_k$ is real additive white Gaussian noise with variance of $\sigma^2$. In order to determine the unknown value A, a probability density function is a preferred technique. The probability density function of $r_k$ can be expressed as:

$$f(r_k) = \frac{1}{2}\{f_+(r_k) + f_-(r_k)\} \quad \text{Equation 5}$$

where $$f_+(r_k) = \frac{1}{\sqrt{2\pi}\,\sigma} e^{-\frac{(r_k - A)^2}{2\sigma^2}} \quad \text{Equation 6}$$

and $$f_-(r_k) = \frac{1}{\sqrt{2\pi}\,\sigma} e^{-\frac{(r_k + A)^2}{2\sigma^2}}. \quad \text{Equation 7}$$

For a received sample of consecutive symbols of length N $(r_1, r_2, \ldots, r_N)$, the probability density function can be expressed as:

$$f_N(r_1, r_2, \ldots, r_N) = \prod_{k=1}^{N} f(r_k) \quad \text{Equation 8}$$

An equation for amplitude A which maximizes the probability function can be determined by taking the partial derivative of Equation 8 with respect to amplitude A, and setting the partial derivative equal to zero:

$$\frac{\partial f_N(r_1, r_2, \ldots, r_N)}{\partial A} = 0 \quad \text{Equation 9}$$

The determination of a maximum likelihood estimate of A is then the solution to Equation 10:

$$A = \frac{1}{N} \sum_{k=1}^{N} r_k \, th\left(\frac{A r_k}{\sigma^2}\right) \quad \text{Equation 10}$$

where $$th(x) = \frac{e^x - e^{-x}}{e^x + e^{-x}}. \quad \text{Equation 11}$$

Since the SNR is unknown, it may possibly be high or low. If the SNR is high, an acceptable approximation for value th can be made as follows:

$$th\left(\frac{A r_k}{\sigma^2}\right) \cong \begin{cases} +1, & r_k > 0 \\ -1, & r_k < 0 \end{cases} \quad \text{Equation 12}$$

The decision-directed amplitude estimate is then:

$$\hat{A} = \frac{1}{N} \sum_{k=1}^{N} |r_k| \quad \text{Equation 13}$$

The noise power can be estimated as total power minus the signal power, and the SNR can therefore be estimated as:

$$SNR = \frac{\left(\frac{1}{N}\sum_{k=1}^{N} |r_k|\right)^2}{\frac{1}{N}\sum_{k=1}^{N} r_k^2 - \left(\frac{1}{N}\sum_{k=1}^{N} |r_k|\right)^2} \quad \text{Equation 14}$$

In an alternative embodiment, for a signal in which the time synchronization and the carrier phase synchronization have been obtained for MPSK modulation, the value $s_k$ of Equation 4 is the transmitted M-ary PSK signal, represented as:

$$A e^{j 2\pi k/M}, \quad k = 0, 1, \ldots M-1 \quad \text{Equation 15}$$

with equal probability of 1/M and A as the amplitude of MPSK signal $s_k$. Value $n_k$ from Equation 4 is the complex additive white Gaussian noise with variance of $2\sigma^2$. The probability density function of $r_k$, where $$r_k = x_k + j y_k \quad \text{Equation 16}$$

can be expressed as:

$$f(x_k, y_k) = \frac{1}{M} \sum_{l=0}^{M-1} \frac{1}{\sqrt{2\pi}\sigma} \exp\left\{-\frac{(x_k - X_l A)^2 + (y_k - Y_l A)^2}{2\sigma^2}\right\}$$

Equation 17 where $$X_l + jY_l = e^{j2\pi l/M}$$

Equation 18 and $j=\sqrt{-1}$. For a received sample of consecutive MPSK symbols of length N ($r_1, r_2, \ldots, r_N$), the probability density function can be expressed as:

$$f_N(r_1, r_2, \ldots, r_N) = \prod_{k=1}^{N} f(x_k, y_k)$$

Equation 19

Using Equation 9, the partial derivative of Equation 19 with respect to amplitude A is performed and set to zero, resulting in the following equation:

$$\sum_{k=1}^{N} \frac{\partial f(x_k, y_k)/\partial A}{f(x_k, y_k)} = 0$$

Equation 20

According to Equation 20, the equation for amplitude A which maximizes the probability function is derived and expressed as follows:

$$A = \frac{1}{N} \sum_{k=1}^{N} \frac{\sum_{l=0}^{M-1} [x_k X_l + y_k Y_l] \exp\left\{\frac{(x_k X_l + y_k Y_l)A}{\sigma^2}\right\}}{\sum_{l=0}^{M-1} \exp\left\{\frac{(x_k X_l + y_k Y_l)A}{\sigma^2}\right\}}$$

Equation 21

If the actual SNR is high, an acceptable decision-directed amplitude estimation is then:

$$\hat{A} \approx \frac{1}{N} \sum_{k=1}^{N} [x_k \hat{X}_k + y_k \hat{Y}_k]$$

Equation 22 where $(\hat{X}_k, \hat{Y}_k)$ is the estimated signal that maximizes $X_l$ and $Y_l$:

$$(\hat{X}_k, \hat{Y}_k) = \arg\left\{\max_{X_l, Y_l}\{x_k X_l + y_k Y_l, l = 0, 1, \ldots, M-1\}\right\}$$

Equation 23

A method 100 for an iterative SNR estimation for a BPSK signal using Equation 10 is shown in FIG. 1. Given an amplitude estimate $A_0$ and a noise variance estimate $\sigma_0^2$, a new amplitude estimate $A_1$ is calculated by Equation 24, which is based on Equation 10:

$$A_1 = \frac{1}{N} \sum_{k=1}^{N} r_k th\left(\frac{A_0 r_k}{\sigma_0^2}\right),$$

Equation 24 and a new noise variance estimate $\sigma_1^2$ by:

$$\sigma_1^2 = \frac{1}{N} \sum_{k=1}^{N} r_k^2 - A_1^2$$

Equation 25

As the method is updated, $A_0^2/\sigma_0^2$ converges to $A_1^2/\sigma_1^2$. Since the SNR to be estimated is unknown, an initial SNR is assumed (step 101), denoted as:

$$SNR_0 = A_0^2/\sigma_0^2$$

Equation 26

In step 102, corresponding values for $A_0$ and $\sigma^2$ are calculated as:

$$A_0 = \sqrt{\frac{SNR_0}{1 + SNR_0}}$$

Equation 27 and $$\sigma_0^2 = \frac{1}{1 + SNR_0}.$$

Equation 28

Next in step 103, Equations 24 and 25 are used to calculate $A_1$, $\sigma_1^2$, and $SNR_1$ is calculated in step 104 by Equation 29:

$$SNR_1 = A_1^2/\sigma_1^2$$

Equation 29

Step 105 performs a decision as to whether estimate $SNR_0$ is within a predetermined acceptable resolution compared to the calculated $SNR_1$. If the resolution is acceptable, then $SNR_0$ can be accepted as the final estimate (step 107). Otherwise, $SNR_0$ is adjusted (step 106) and the process repeats starting at step 102. As an example with a predetermined acceptable resolution of 0.1 dB as the benchmark, steps 102 through 106 are repeated until the difference between calculated $SNR_1$ and estimate $SNR_0$ is less than or equal to 0.1 dB. Alternatively, steps 102 through 106 are repeated for a predetermined number of times before bringing an end to the estimation process (step 107), and accepting the resulting estimate value, regardless of the intermediate resolutions.

A similar method for MPSK signals can be performed by replacing Equation 24 in step 103 with Equation 30, which is based on Equation 21, to calculate amplitude $A_1$:

$$A_1 = \frac{1}{N} \sum_{k=1}^{N} \frac{\sum_{l=0}^{M-1} \begin{bmatrix} x_k X_l + \\ y_k Y_l \end{bmatrix} \exp\left\{\frac{(x_k X_l + y_k Y_l)A_0}{\sigma_0^2}\right\}}{\sum_{l=0}^{M-1} \exp\left\{\frac{(x_k X_l + y_k Y_l)A_0}{\sigma_0^2}\right\}}$$

Equation 30

Figure 3:
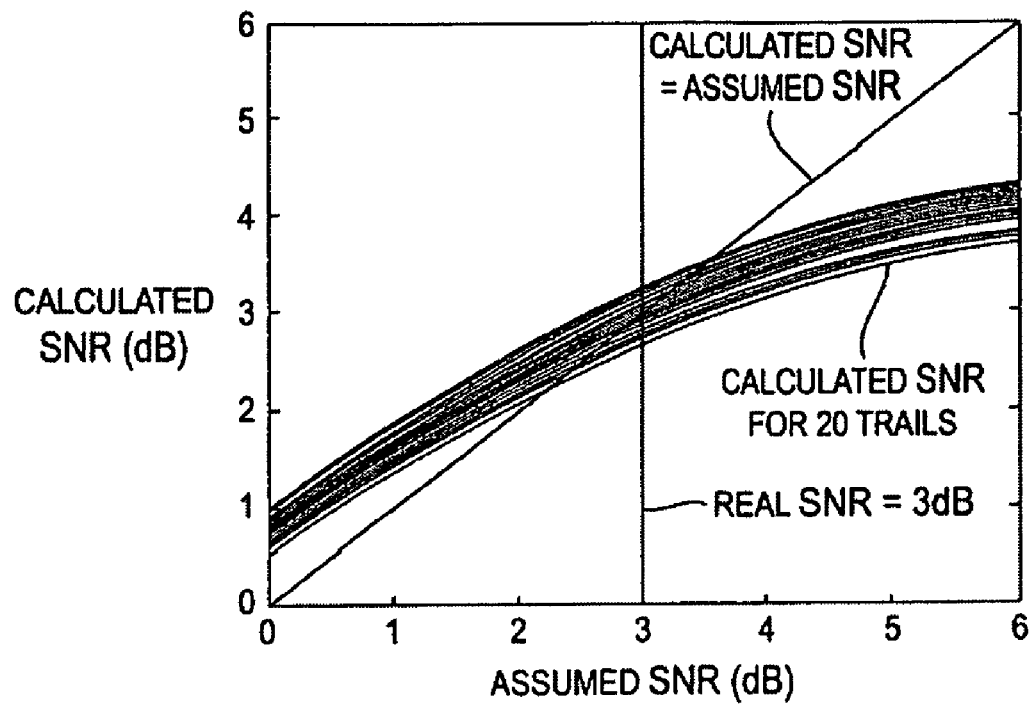
FIG. 3 shows a graph of calculated SNRs plotted against assumed SNRs using method 100.

FIG. 3 shows curves of calculated SNRs versus assumed SNRs for twenty 1024-point sample vectors each with a real SNR of 3 dB. Each curve crosses the straight line "calculated SNR=assumed SNR" at one point. The crossing point is the estimated SNR for a converged method. It is noteworthy that the crossing points are concentrated around the true SNR of 3 dB. Variations among the 20 curves are due to the random nature of the noise component during each trial. The calculated values vary approximately between −1 dB and +0.5 dB. When the assumed SNR value is greater than the actual SNR, the calculated SNR value is less than the assumed value. This relationship is useful for quick convergence as each successive assumed SNR value can properly be increased or reduced accordingly.

Figure 2:
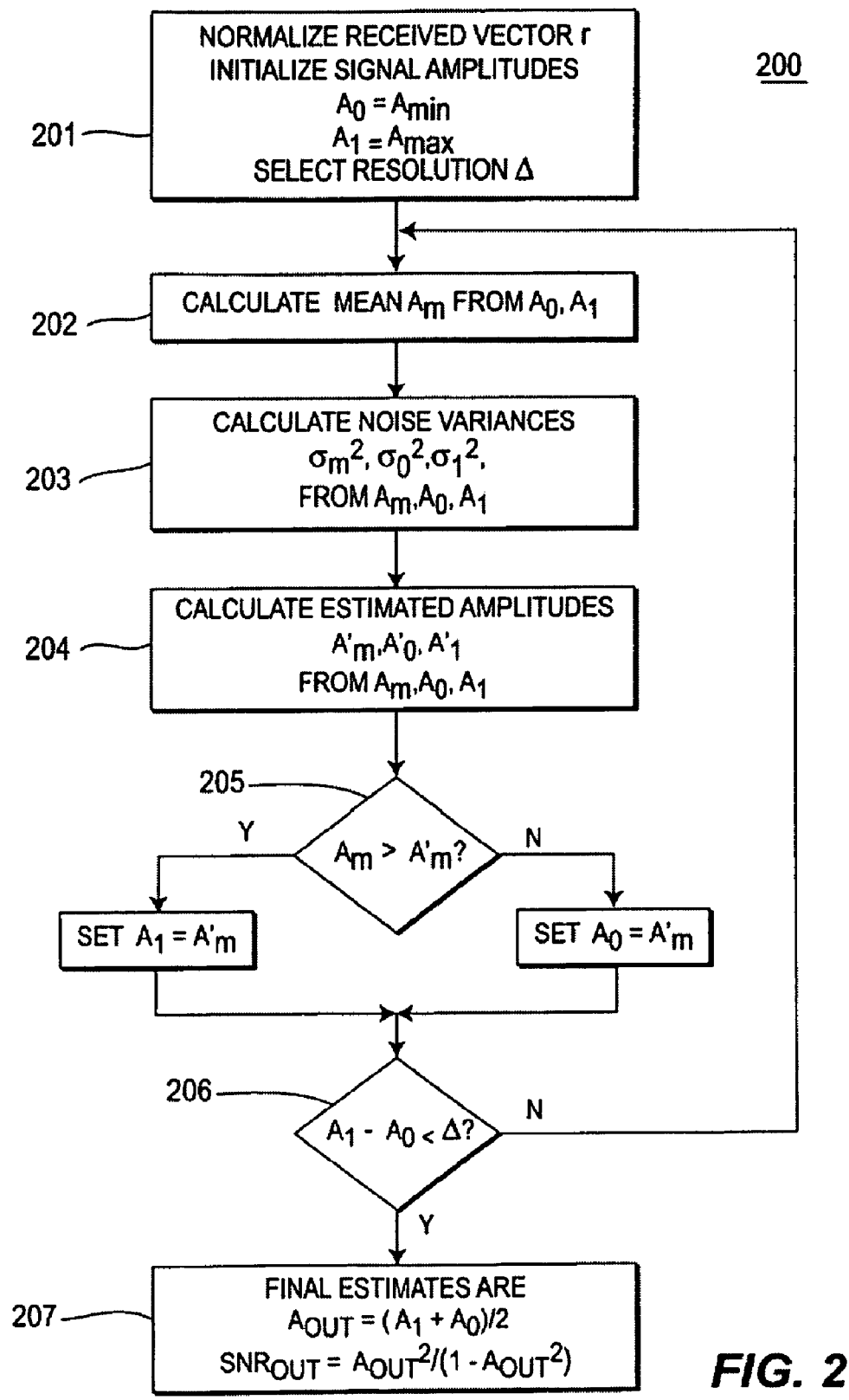
FIG. 2 shows a process flow diagram of method 200 for SNR estimation.

An alternative method is to iteratively solve for amplitude A, then to compute the SNR estimate upon convergence, as shown by flow diagram of method 200 in FIG. 2. In Step 201, the received vector is normalized such that:

$$\frac{1}{N}\sum_{k=1}^{N} r_k^2 = 1 \qquad \text{Equation 31}$$

Assumed minimum and maximum amplitudes of interest $A_{min}$ and $A_{max}$ are selected, and a predetermined resolution $\Delta$ is selected. Values $A_0$ and $A_1$ are initialized as follows: $A_0 = A_{min}$ and $A_1 = A_{max}$.

In steps 202 and 203, the mean of $A_0$ and $A_1$ is calculated by:

$$A_m = (A_0 + A_1)/2 \qquad \text{Equation 32}$$

and the corresponding noise variances are determined by:

$$\sigma_0^2 = 1 - A_0^2 \qquad \text{Equation 33}$$

$$\sigma_1^2 = 1 - A_1^2 \qquad \text{Equation 34}$$

$$\sigma_m^2 = 1 - A_m^2 \qquad \text{Equation 35}$$

In step 204, three estimated amplitude values, $A'_0$, $A'_1$ and $A'_m$ are calculated using Equation 24 by substituting the initial amplitude values $A_0$, $A_1$ and $A_m$, for $A_0$ in Equation 24 and initial noise variances $\sigma_0$, $\sigma_1$ and $\sigma_m$, respectively, for $\sigma_0$ in Equation 24.

For step 205, if $A_m > A'_m$, then the maximum amplitude $A_1$ is updated as follows: $A_1 = A'_m$. Otherwise, the minimum amplitude $A_0$ is updated: $A_0 = A'_m$. In an alternative embodiment for step 205, if $A_m > A'_m$, then amplitude $A_1$ can be updated so that $A_1 = A_m$; otherwise the minimum amplitude $A_0$ is updated: $A_0 = A_m$.

For step 206, the resolution $\Delta$ is evaluated. If $A_1 - A_0 < \Delta$, then the estimated amplitude is the updated value $A_{OUT} = (A_0 + A_1)/2$ with either $A_0$ or $A_1$ as updated amplitude values from step 205. The final estimated signal-to-noise ratio $SNR_{OUT}$ is calculated from the estimated amplitude value $A_{OUT}$ as follows: $SNR_{OUT} = A_{OUT}^2 / (1 - A_{OUT}^2)$. Otherwise the process is repeated by returning to step 202 and repeating the steps through step 206 until an acceptable resolution $\Delta$ is achieved.

As with method 100, method 200 can be modified to accommodate an MPSK signal. This is achieved by calculating amplitude estimates $A'_0$, $A'_1$ and $A'_m$ using Equation 30 instead of Equation 24 in step 204.

Figure 4:
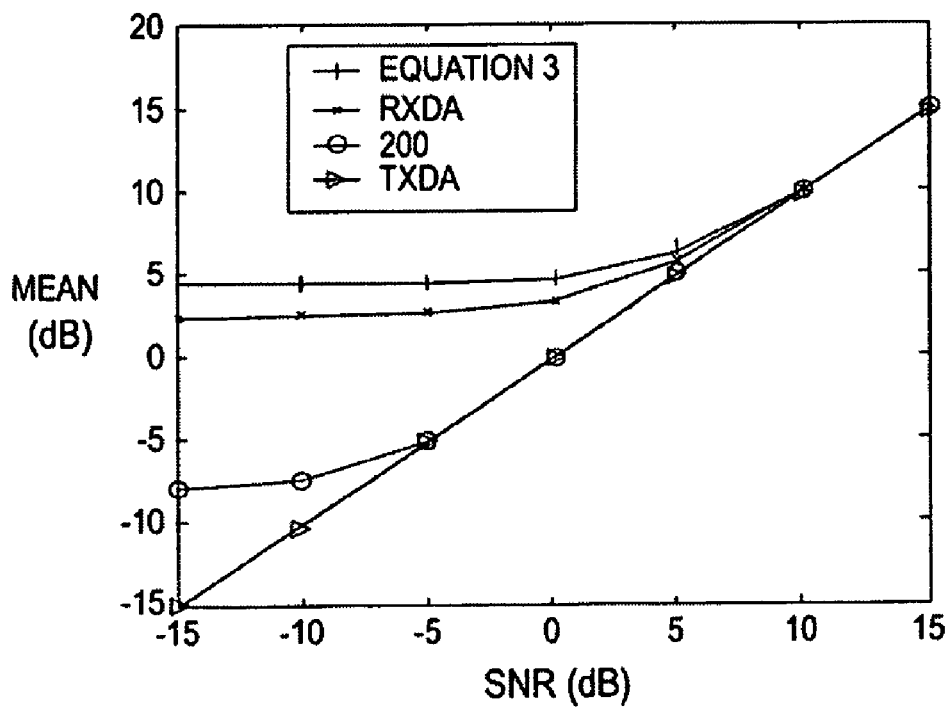
FIG. 4 shows a comparison of mean SNR estimates of a BPSK signal performed by method 200, RXDA, TXDA and a third other algorithm, with sampling N=1024.
Figure 5:
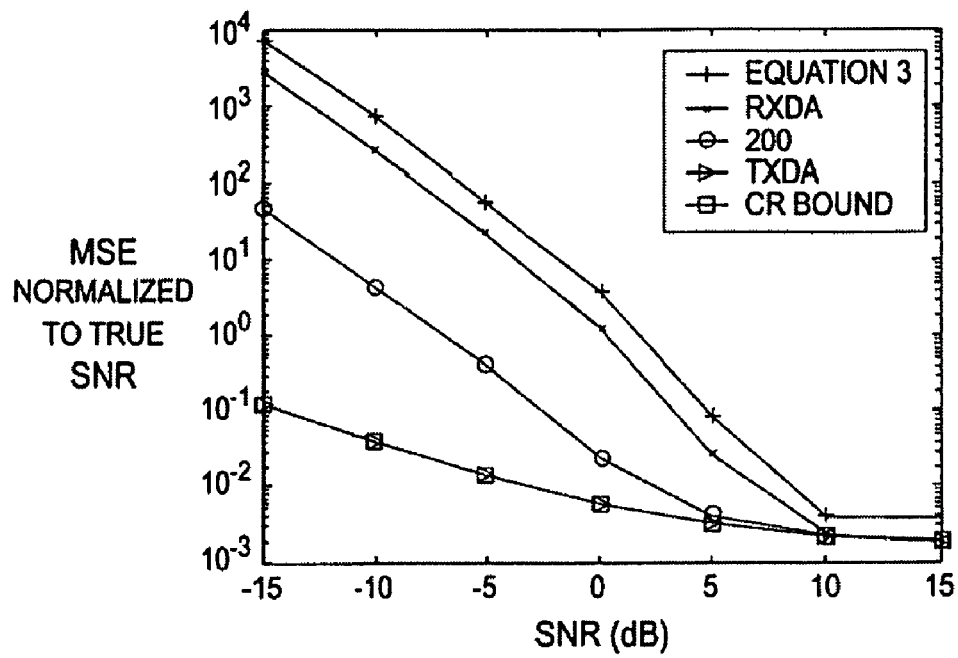
FIG. 5 shows a comparison of mean square errors (MSE) normalized to SNR of a BPSK signal, performed by method 200, RXDA, TXDA, a third algorithm and the Cramer-Rao (CR) bound, with sampling N=1024.
Figure 6:
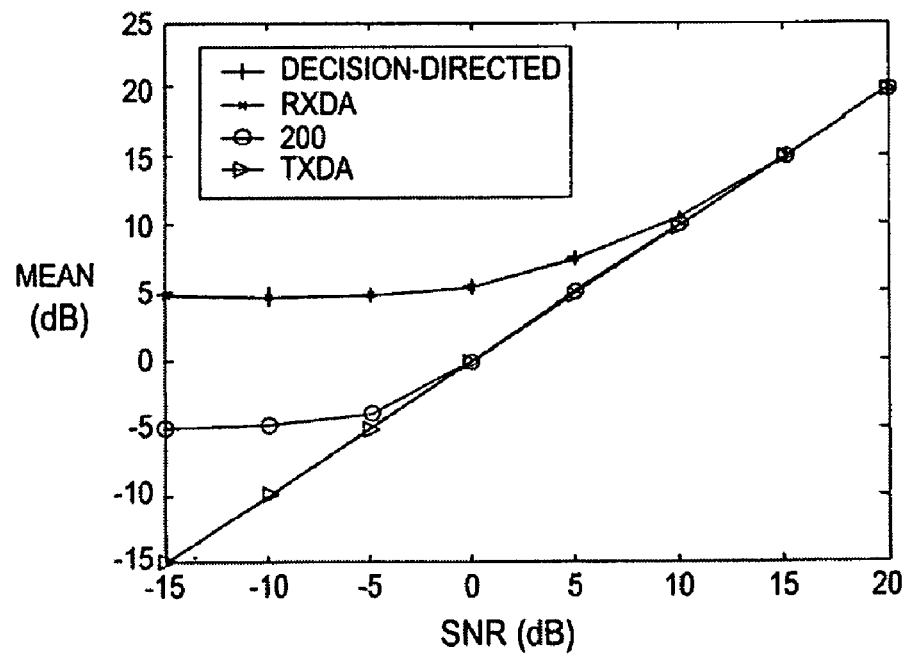
FIG. 6 shows a comparison of mean SNR estimates of an 8PSK signal performed by method 200, a decision directed algorithm, RXDA and TXDA, with sampling N=100.
Figure 7:
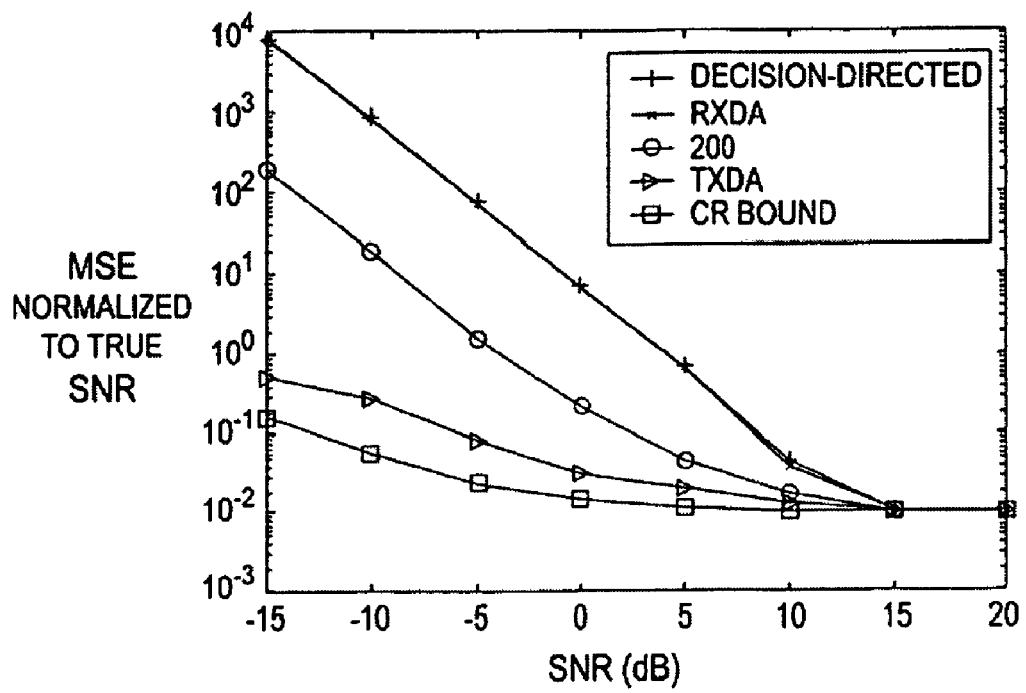
FIG. 7 shows a comparison of mean square errors (MSE) normalized to SNR of an 8PSK signal performed by method 200, a decision directed algorithm, RXDA, TXDA and the Cramer-Rao (CR) bound, with sampling N=100.
Figure 8:
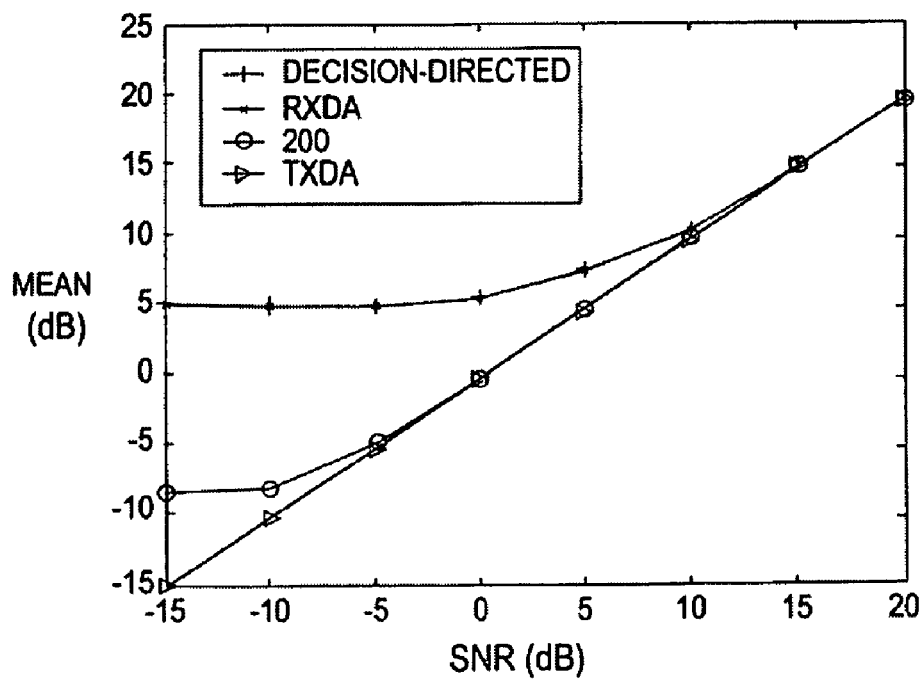
FIG. 8 shows a comparison of mean SNR estimates of an 8PSK signal performed by method 200, a decision directed algorithm, RXDA and TXDA, with sampling N=1024.
Figure 9:
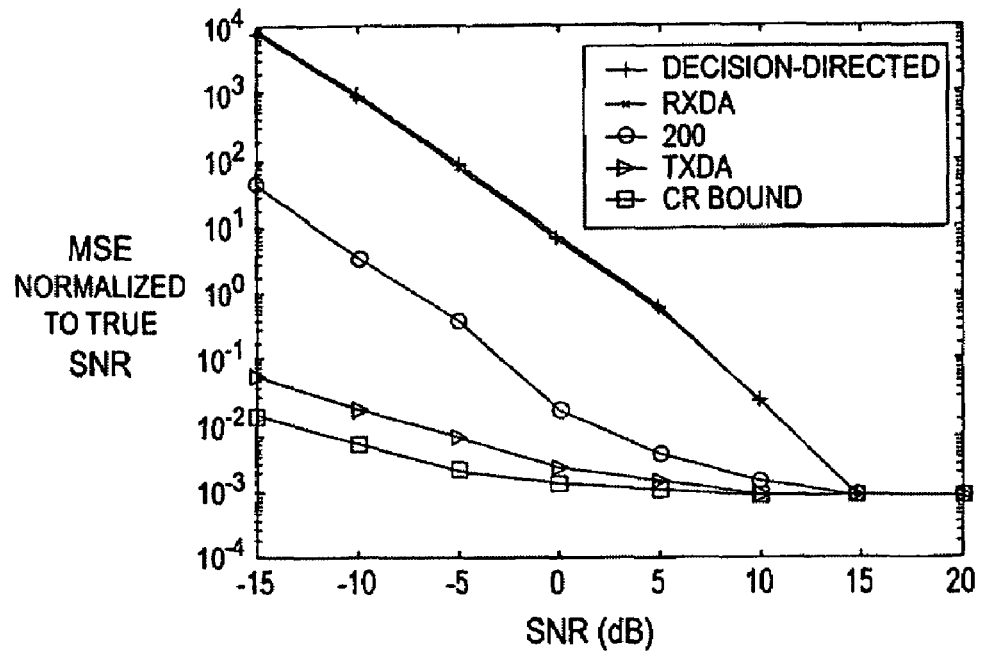
FIG. 9 shows a comparison of mean square errors (MSE) normalized to SNR of an 8PSK signal performed by method 200, a decision directed algorithm, RXDA, TXDA and the Cramer-Rao (CR) bound, with sampling N=1024.

The lower bias of method 200 can be seen in FIGS. 4-13 in which the mean SNR and normalized mean square error (MSE) results are compared against various SNR algorithms. Simulation results for the iterative SNR estimation method 200 are graphically compared to the RXDA, the TXDA, and the Equation 3 SNR estimation algorithms as shown in FIGS. 4-5. As aforementioned, the TXDA algorithm is based on exact knowledge of the received data, which is only applicable to known training sequences. The TXDA curve is therefore shown as a baseline for comparison purposes.

FIG. 4 shows means of the various SNR estimations generated using a received vector of 1024 samples (N=1024) versus the actual SNR. The iterative SNR estimation method 200 has a lower bias (excepting the known data case) and the useful range extends down to about −5 dB. For comparison, the useful range in each case for RXDA and Equation 3 algorithms only extends down to about 8 dB.

FIG. 5 shows the normalized mean square error (MSE) of the SNR estimations where N=1024 and also shows the Cramer-Rao (CR) bound that is lower bounded by $$CR \geq 2\left\{\frac{2}{A^2 N} + \frac{1}{N}\right\}.$$

The estimation by method 200 produces results having a lower normalized MSE than that for RXDA and Equation 3.

FIGS. 6-9 show mean and MSE results of method 200 compared with RXDA, TXDA, and decision-directed for an 8PSK signal. Comparison of FIGS. 6, 7 to FIGS. 8, 9 show the improvement in mean and MSE versus SNR by method 200 when the sample length is increased from N=100 to N=1024, respectively. It should be noted that improvements are evident for method 200 whereas those for Equations 1 and 3 show no improvement.

Figure 10:
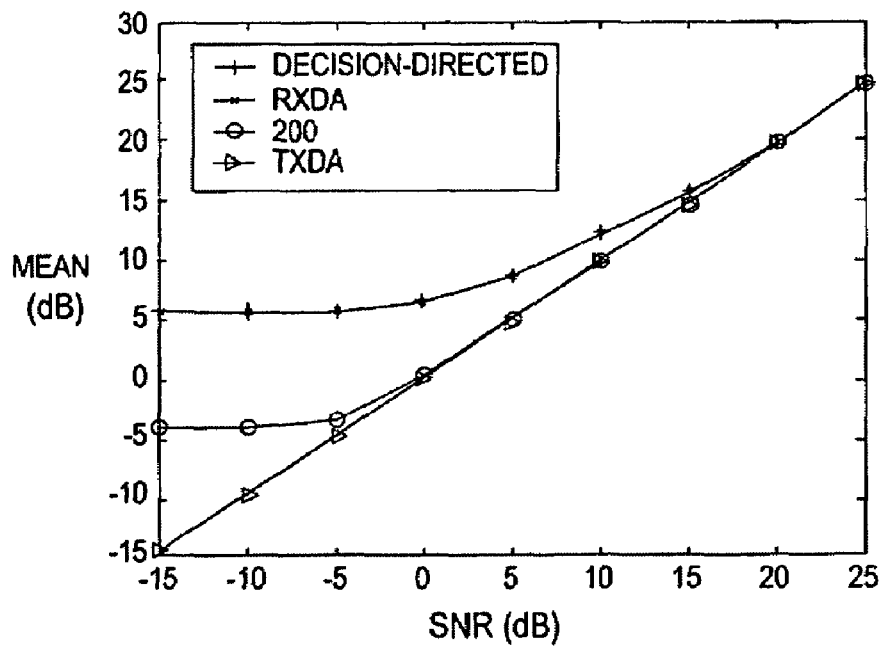
FIG. 10 shows a comparison of mean SNR estimates of a 16PSK signal performed by method 200, a decision directed algorithm, RXDA and TXDA, with sampling N=100.
Figure 11:
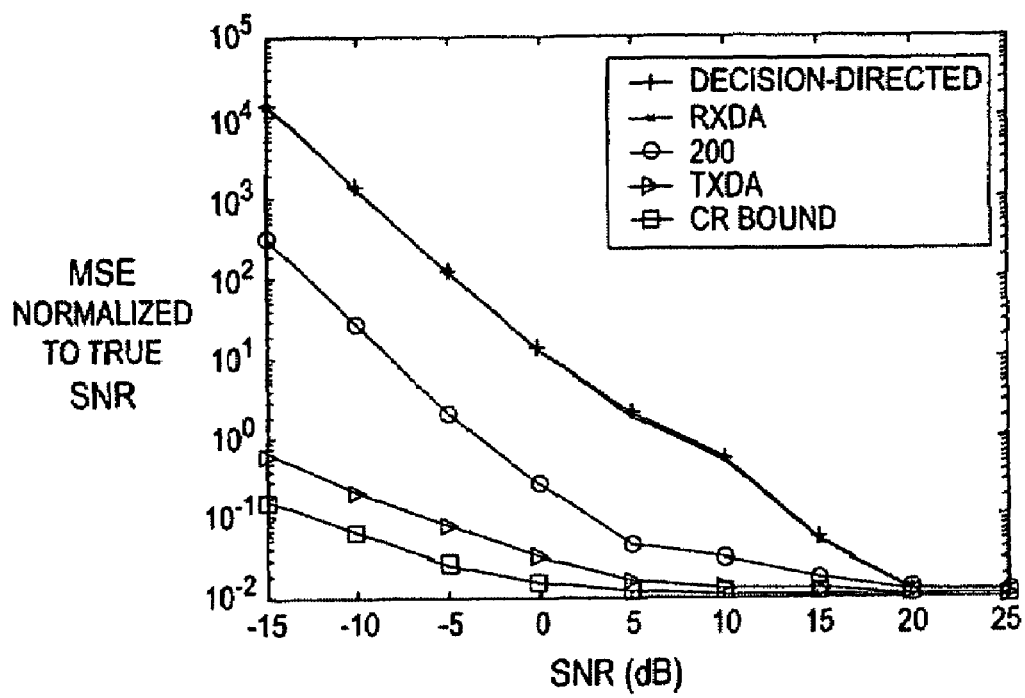
FIG. 11 shows a comparison of mean square errors (MSE) normalized to SNR of a 16PSK signal performed by method 200, a decision directed algorithm, RXDA, TXDA and the Cramer-Rao (CR) bound, with sampling N=100.
Figure 12:
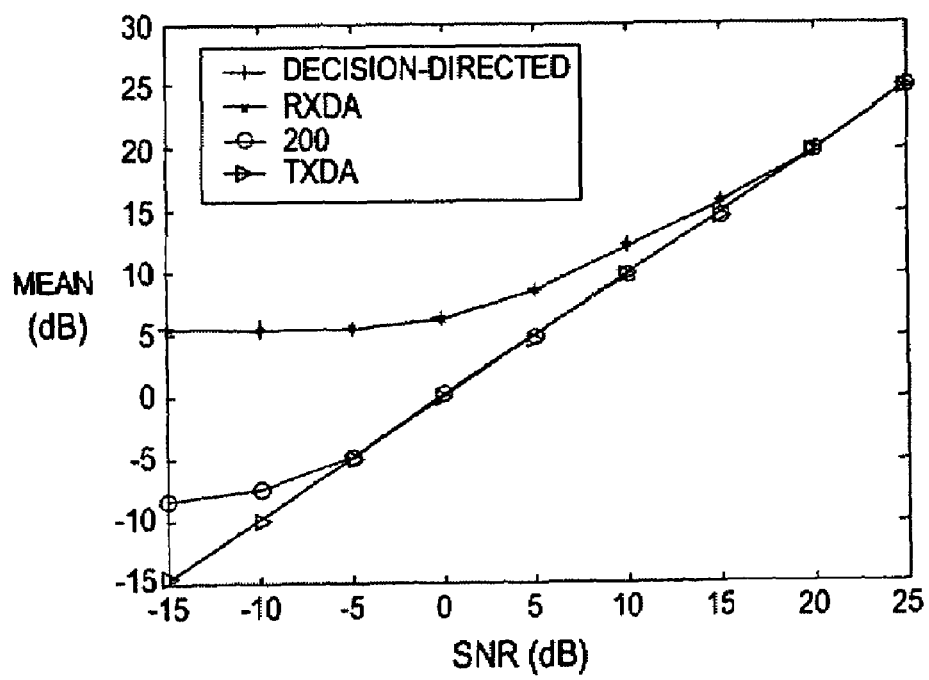
FIG. 12 shows a comparison of mean SNR estimates of a 16PSK signal performed by method 200, a decision directed algorithm, RXDA and TXDA, with sampling N=1024.
Figure 13:
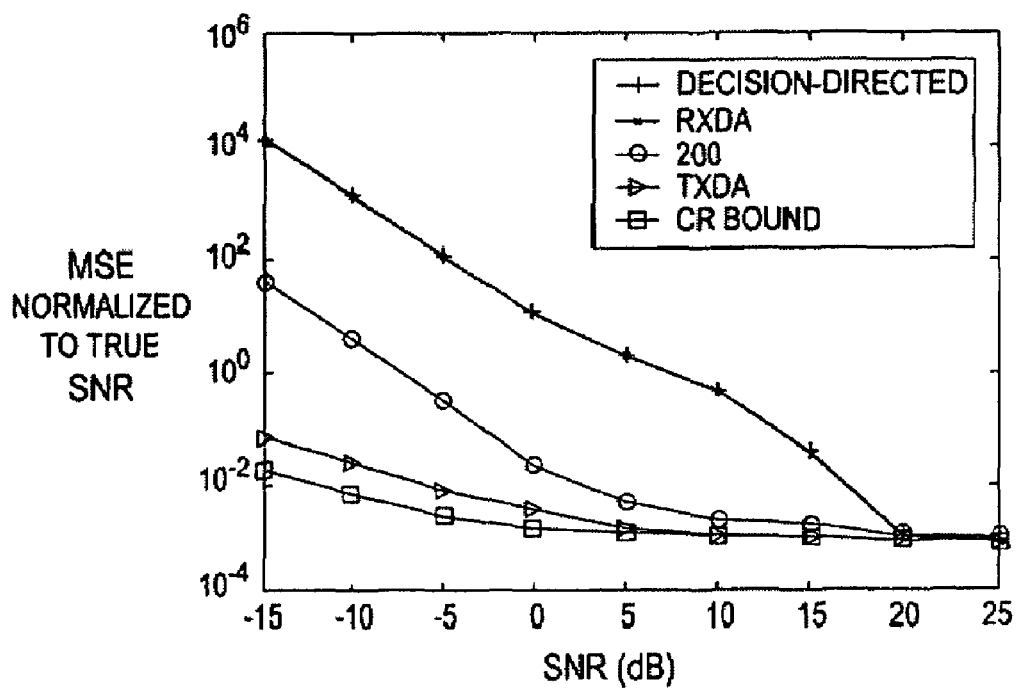
FIG. 13 shows a comparison of mean square errors (MSE) normalized to SNR of a 16PSK signal performed by method 200, a decision directed algorithm, RXDA, TXDA and the Cramer-Rao (CR) bound, with sampling N=1024.

Similarly, FIGS. 10-11 show mean and MSE results for a 16PSK signal for N=100 and FIGS. 12, 13 show mean and MSE results for a 16PSK signal for N=1024 with similar results.

Figure 14:
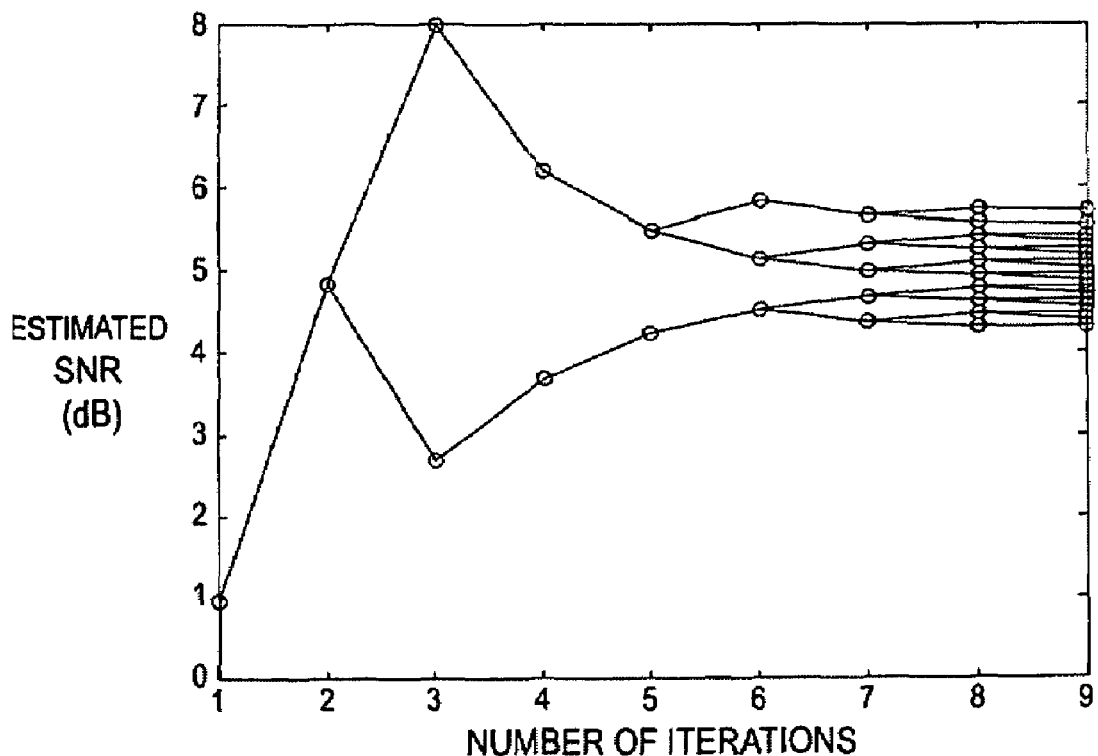
FIG. 14 shows a convergence of estimation iterations for several trials of method 200.

FIG. 14 shows several trajectories of convergence within 9 iterations for method 200. In general, the number of iterations depends on $A_{min}$, $A_{max}$ and the resolution $\Delta$. In this example, $A_{min}=0.001$, $A_{max}=0.999$ and $\Delta=0.0002$. As shown in FIG. 14, the estimated SNR stabilizes after 7 iterations and by the $9^{th}$ iteration, $A_1 - A_0 < \Delta$, and the estimation is finished.

Figure 15:
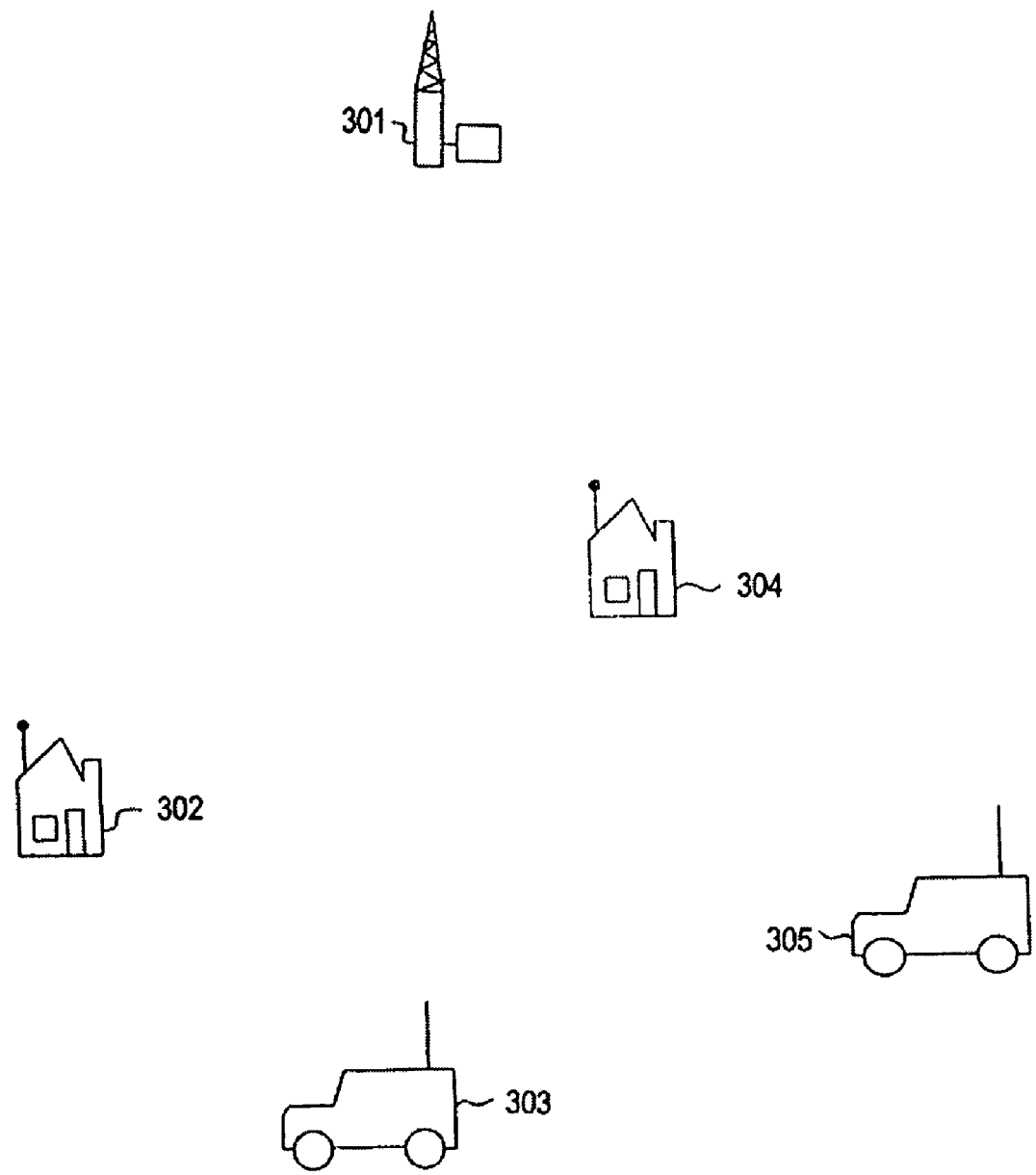
FIG. 15 shows a system for communications between a base station and user equipments employing SNR estimation methods 100 and 200.

FIG. 15 shows an embodiment for using methods 100 and 200, comprising a system for wireless communications, such as CDMA, with base station 301 and user equipments (UEs) 302-305. Base station 301 and (UEs) 302-305 each include an SNR estimator which performs the low bias SNR estimation method 200. Improved SNR estimation provides several advantages for base station and UE performance. For instance, improved SNR estimation for a UE is enhanced power control from having more accurate assessment of the required uplink power. At the base station, improved channel selection results from better SNR estimation.

What is claimed is:

1. A user equipment (UE) comprising:
   an estimator configured to:
   select a first estimate of a signal-to-noise ratio (SNR);
   calculate an amplitude value based on a probability density and a noise variance based on the amplitude value;
   calculate a second SNR based on the amplitude value and the noise variance;
   calculate a resolution value based on the difference between the first SNR estimate and the second SNR;
   adjust the first SNR estimate; and
   perform estimation iterations until the resolution value is equal to a predetermined value.

2. The estimator as in claim 1 wherein the estimation iterations are based on the adjusted first SNR.

3. The estimator as in claim 1 wherein the estimator is configured to perform a low-biased estimation of a SNR of a sequence of received BPSK communication symbols.

4. The estimator as in claim 1 wherein the estimator is configured to perform a low-biased estimation of a SNR of a sequence of received M-ary PSK communication symbols, where M represents a quantity of phases for PSK.

* * * * *

UNITED STATES PATENT AND TRADEMARK OFFICE
CERTIFICATE OF CORRECTION

| | | |
|---|---|---|
| PATENT NO. | : 7,590,172 B2 | Page 1 of 1 |
| APPLICATION NO. | : 12/060541 | |
| DATED | : September 15, 2009 | |
| INVENTOR(S) | : Li et al. | |

It is certified that error appears in the above-identified patent and that said Letters Patent is hereby corrected as shown below:

At column 1, delete Equation 1, and insert therefor $$-- \quad SNR = \frac{\left(\frac{1}{N}\sum_{k=1}^{N}|r_k|\right)^2}{\frac{1}{N}\sum_{k=1}^{N}r_k^2 - \left(\frac{1}{N}\sum_{k=1}^{N}|r_k|\right)^2} \quad --.$$

At column 5, delete Equation 17, and insert therefor $$-- \quad f(x_k, y_k) = \frac{1}{M}\sum_{l=0}^{M-1}\frac{1}{\sqrt{2\pi}\sigma}\exp\left\{-\frac{(x_k - X_l A)^2 + (y_k - Y_l A)^2}{2\sigma^2}\right\} \quad --.$$

Signed and Sealed this

Thirty-first Day of August, 2010

David J. Kappos
*Director of the United States Patent and Trademark Office*